(No Model.)
W. H. BOWMAN.
SAW SET.
No. 438,093. Patented Oct. 7, 1890.
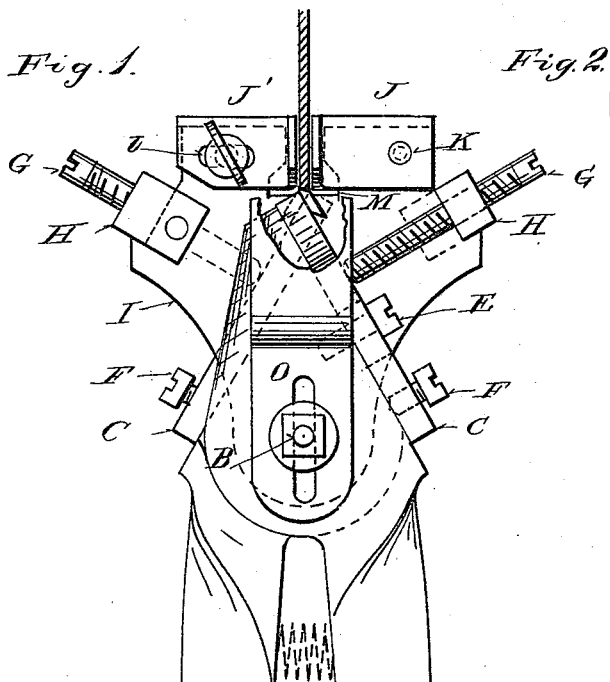
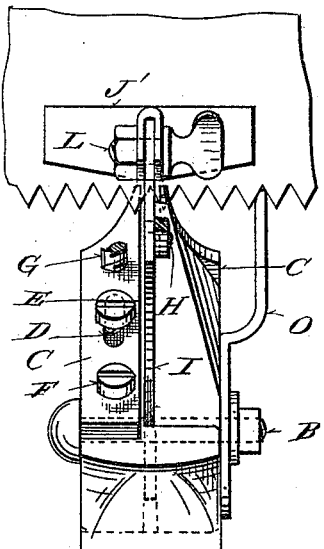
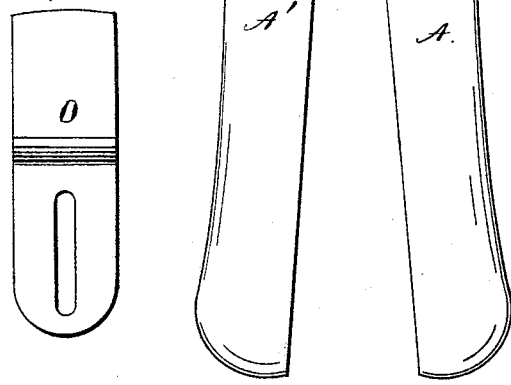
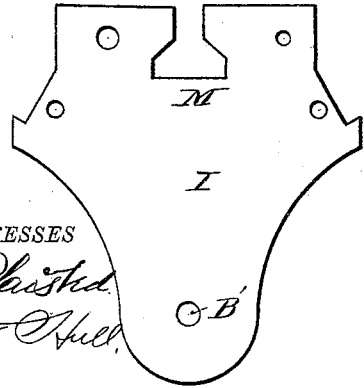
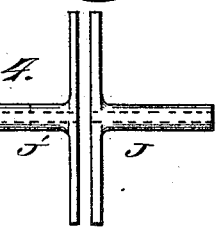
WITNESSES
INVENTOR

UNITED STATES PATENT OFFICE.

WILLIAM H. BOWMAN, OF SOUTH SOLON, ASSIGNOR OF TWO-THIRDS TO ROBERT W. JONES AND JOHN F. SMITH, BOTH OF LONDON, OHIO.

SAW-SET.

SPECIFICATION forming part of Letters Patent No. 438,093, dated October 7, 1890.

Application filed June 11, 1890. Serial No. 354,994. (No model.)

*To all whom it may concern:*

Be it known that I, WILLIAM H. BOWMAN, a citizen of the United States, residing at South Solon, in the county of Madison and State of Ohio, have invented certain new and useful Improvements in Saw-Sets, of which the following is a specification, reference being had therein to the accompanying drawings.

My invention relates to certain new and useful improvements in saw-sets.

My improvements have reference to means for equalizing the pressure on both sides of the saw, have reference to setters having side bearing-surfaces and adjustable as to the size of the teeth and the amount of set, have reference to means whereby one side of the device may be made inoperative, and thus enable the device to be used as a single or a double saw-set, as desired, and have reference to other points of detail, hereinafter to be more fully described, and pointed out in the claims.

In the accompanying drawings, forming a part of this specification, and on which like reference-letters indicate corresponding parts, Figure 1 represents a side view of my device; Fig. 2, an edge view of the same; Fig. 3, a plan view of the T-guide; Fig. 4, a detail view of the body-plate, and Fig. 5 a detail view of the inclined guide.

The letters A and A' designate the handles of my saw-set, which are pivoted together by a bolt B or otherwise, so as to be actuated like a pair of shears and by one hand only. These handles have inclined surfaces, on which are mounted setters C, preferably consisting of tempered steel, and tapered to form a side bearing-surface at the upper point of each, so as to fit in between the teeth in making the set. A slot D and a set-screw E constitute a convenient means for adjusting each setter according to the size of the teeth in the saw-blade operated on. A set-screw F engages with the said inclined face of each handle, whereby the setter is fixed in its adjusted position. Thus it may be shoved up and down, or the upper side bearing end may be swung around the pin E as a center to accommodate teeth which are of different pitch or distances apart. The setters work in opposite directions and set one tooth in one direction and the next tooth in the opposite direction by the same operation of the handles, thus setting two teeth at once. The action of each setter is first on the point or tip of each tooth and the pressure is gradually carried upward to the root of the tooth.

The action of the setters is limited by the adjustable stops G, preferably in the form of screws mounted in the lugs H, carried by the body-plate I, pivoted to the same center as the handles A and A'. These stops are brought down on their respective setters and limit the shear-like action of the points of the same. Thus the amount of set or outward bend of the teeth may be limited, and there is no danger of the teeth being broken from the blade on account of the before-described action of the setters and the adjustable stops. One stop may be screwed down upon its setter, thus fixing the body-plate to the handle on that side, rendering the corresponding setter inoperative, while the other setter may be free to act. This converts the double-action into a single-action setter when it is desired so to do.

In order to guide the saw-blade and prevent its accidental disengagement from the setters, I provide a guide, preferably composed of two T-shaped pieces J and J', one fixed to the said body-plate by a rivet K or otherwise and the other adjustably connected to the said plate by a thumb-screw and nut L passing through a slot $l$ in the same and fitted through said plate. The adjustable plate J' may therefore be moved close to the saw-blade operated on, thus causing each tooth to receive a uniform set and preventing any twisting or breaking of the blade. The body-plate may be cut away at M, as shown in Fig. 4, to allow the set of the tooth to pass without interfering. The plate being pivoted at B, will oscillate on said pivot as a center, and thus equalize the working pressure of the setters on the opposite sides of adjacent teeth, whereby one tooth will not receive an excessive or unequal pressure when the device is used as a double saw-set. Narrow-bladed saws—such as band and jig saws—can thus be easily set by my device.

The T-shaped guides may or may not be used, since the saw-blade may be clamped or otherwise secured while the teeth are set. The convenience of the tool, however, admits of holding the saw-blade in one hand and the device in the other, and the double setting action facilitates the operation greatly, while, if desired, the device may be quickly changed to act as a single saw-set.

A guide O is preferably secured to the pivot B, and is slotted to allow it to be adjusted to and from the saw-blade. It thus acts as a gage to prevent missing the teeth, and also causes the saw to be acted on in the same line. By adjusting it at different heights the set may be given to the teeth at an angle to the direction of the same. For instance, in a rip-saw, in which the front of each tooth is approximately vertical, the guide O may be lowered so as to cause the front edge of each tooth to be set outward, thus securing a greater cutting action of the same. If desired, however, this guide O may be dispensed with.

Another advantage of my device is that if the operation of setting the saw is interrupted the tool remains in place on the saw and the operation may be renewed without trouble and delay in finding the last tooth set.

Again, it will be noticed that my device is a pair of levers of the first class, in which the fulcrum B is between the power and the substance acted on. This renders it easy of manipulation.

If desired, a spring may be used to disengage the working-points, as indicated by the dotted lines in Fig. 1.

It is preferred to make the handles of malleable iron, the body-plate I of steel, and the setters of steel also, and tempered at their working-points. These setters, being detachable, may be easily removed for refitting or renewal at slight expense; and since the operating or working surface of each setter is on the upper side thereof instead of on the end, as in some forms used, the setter on one side may be reversed and used on the other handle when one side is worn down.

Having thus fully described my invention, what I claim as new, and desire to secure by Letters Patent, is—

1. In a saw-set, the combination, with handles and a body-plate pivoted together, of side bearing-setters mounted on said handles on opposite sides of said plate, stops carried by said plate to limit the action of said setters, guides adjustable to the thickness of the saw-blade mounted on said plate, and an adjustable guide to vary the inclination of the set to the teeth.

2. In a saw-set, the combination, with the handles and setting means, of an adjustable guide consisting of a slotted piece adapted to engage the teeth of the saw and vary the inclination of the set by raising or lowering said saw.

3. In a saw-set, the combination, with handles pivoted together and side bearing-setters adjustably mounted thereon, of a body-plate, adjustable stops carried thereby and engaging with the respective setters, whereby one or both setters are limited in their action, and the device adapted to be used either as a single or as a double saw-set.

4. In a saw-set, the combination, with handles pivoted together and forming levers of the first class, of adjustable setters carried by said handles and bearing on alternate teeth by tapering side bearing-surfaces, whereby alternate teeth are pressed in opposite directions at the same time, and means to limit the action of said setters, so that both may act in a greater or less degree on the teeth.

In testimony whereof I affix my signature in presence of two witnesses.

WILLIAM H. BOWMAN.

Witnesses:
 GEO. KENNEDY,
 F. KENNEDY.